United States Patent [19]

Crutchfield

[11] 3,923,841

[45] Dec. 2, 1975

[54] METHOD OF MAKING TETRA SODIUM AND TETRA POTASSIUM 2,2,5,5-TETRAHYDROFURANTETRACARBOXYLATE

[75] Inventor: Marvin M. Crutchfield, Creve Coeur, Mo.

[73] Assignee: Monsanto Company, St. Louis, Mo.

[22] Filed: Nov. 6, 1974

[21] Appl. No.: 521,330

Related U.S. Application Data

[63] Continuation of Ser. No. 282,991, Aug. 23, 1972, abandoned.

[52] U.S. Cl. .............................................. 260/347.3
[51] Int. Cl.² ........................................ C07D 307/24
[58] Field of Search ..................... 260/347.3, 534 E

[56] References Cited
UNITED STATES PATENTS 3,061,628  10/1962  Singer, Jr. et al ................. 260/465.5
3,183,262  5/1965   Singer et al ........................ 260/534
3,317,567  5/1967   Linn .................................. 260/347.3

OTHER PUBLICATIONS

Wagner and Zook, Synthetic Organic Chem., Wiley, New York, (1953), pp. 412–415.
Dickenson et al., J. Am. Chem. Soc., Vol. 82, p. 6133, (1960).
Organic Synthesis, New York–Wiley, Vol. 49, p. 103.

Primary Examiner—Henry R. Jiles
Assistant Examiner—Bernard Dentz
Attorney, Agent, or Firm—Thomas N. Wallin; J. E. Maurer; Neal E. Willis

[57] ABSTRACT

Colorless, crystalline tetrasodium or tetrapotassium tetrahydrofuran-2,2,5,5-tetracarboxylate and hydrates thereof useful as sequestrants and detergency builders are prepared by addition of 2,2,5,5-tetracyanotetrahydrofuran to aqueous sodium or potassium hydroxide.

5 Claims, No Drawings

METHOD OF MAKING TETRA SODIUM AND TETRA POTASSIUM 2,2,5,5-TETRAHYDROFURANTETRACARBOXYLATE

This is a continuation, of application Ser. No. 282,991, filed Aug. 23, 1972 now abandoned.

BACKGROUND OF THE INVENTION

This invention relates to methods of making compounds useful as sequestrants and detergency builders.

Tetrasodium and tetrapotassium-2,2,5,5-tetrahydrofurantetracarboxylate and hydrates thereof are compounds useful as sequestrants and detergency builders.

The colorless, crystalline forms of these compounds are desired for use in detergency formulations from the stand point of esthetic appeal in the market place and to prevent the possible staining of fabrics by colored impurities or by-products.

Colorless, crystalline product can be obtained by conversion of 2,2,5,5-tetracyanotetrahydrofuran to the ester form, followed by basic hydrolysis. However, the esterification step increases production time and product cost and a means of obtaining the product directly from the nitrile is desired.

SUMMARY OF THE INVENTION

It is an object of this invention to provide novel methods of making colorless, crystalline tetrasodium and tetrapotassium-2,2,5,5-tetrahydrofurantetracarboxylate.

In accordance with the invention, this is accomplished by addition of 2,2,5,5-tetracyanotetrahydrofuran to excess sodium hydroxide or potassium hydroxide.

The invention will be understood from the following description of the preferred embodiments.

DESCRIPTION OF THE PREFERRED EMBODIMENTS

The compounds prepared by this invention are tetra alkali metal 2,2,5,5-tetracarboxylates represented by the formula

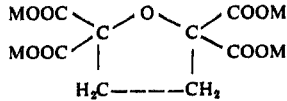

wherein M is sodium or potassium and hydrates thereof. Typical analyses of the hydrated salt indicates the presence of from 1.5 to 2 moles water of hydration after drying at about 60°C.

These compounds exhibit highly effective detergency builder function and sequestration activity. In fact, the sequestration activities of the compounds appear to be substantially greater than that of sodium tripolyphosphate which has long been recognized as an excellent sequestrant. The unexpected properties of the compounds are believed unique to the structures represented in view of the fact that the sequestrant and builder functionality of the isomer tetrahydrofuran-2,3,4,5-tetracarboxylate (see U.S. Pat. No. 3,580,852 for disclosure of builder utility of the isomer) is substantially less than that of sodium tripolyphosphate.

The colorless crystalline forms of the compounds produced by the method hereinafter described are particularly preferred for use in detergent formulations. Further, the use of the tetrasodium salt forms of the compounds is generally preferred.

In the process of this invention, the compounds described above are prepared by reaction of the nitrile (2,2,5,5-tetracyanotetrahydrofuran) in aqueous sodium or potassium hydroxide.

The 2,2,5,5-tetracyanotetrahydrofuran is known to those skilled in the art, its preparation being described, for example, in U.S. Pat. No. 3,317,567.

The nitrile is added to an aqueous solution of sodium hydroxide or potassium hydroxide. It is essential during nitrile addition that the concentration of base be maintained in excess of that required to react with the nitrile in the reaction medium. It is further essential that the nitrile be added to the base rather than the base to the nitrile in order to obtain a colorless crystal product. If the base is added to the nitrile or the nitrile concentration stoichiometrically exceeds that of the base, the tetracarboxylate is produced; however, the formation of by-products results in undesirable product coloration.

The crystalline carboxylate can be recovered by heating the solution to evaporate free water if the hydrate is desired or by heating at 100°C to 250°C for longer periods of time to remove water of hydration if the anhydrous carboxylate is desired. Preferably, the crystalline hydrate is precipitated from the solution by provision of a 10 to 30% by weight concentration of excess free sodium hydroxide therein to depress the solubility of the hydrate. This large excess may be present during the hydrolysis or may be added subsequently.

In a particularly preferred embodiment of the invention, the nitrile is added either as a dry crystal or as a concentrated aqueous slurry to a hot (50°C to 150°C) solution of sodium hydroxide sufficiently concentrated so that at the completion of the nitrile addition and reaction, the solution contains 10 to 20% unreacted free sodium hydroxide. The crystalline material is physically separated by conventional techniques such as centrifugation, filtration, etc., and washed. The wash and mother liquor can, of course, be recycled and utilized for hydrolysis of additional nitrile if desired. By this procedure, the colorless crystalline tetra alkali metal 2,2,5,5-tetracarboxylate is recovered as a hydrate.

Either the anhydrous or hydrate form of the carboxylate can be incorporated into detergent formulations. The stability of the anhydrous salt at temperatures up to 400°C permits the preparation of detergent formulations by conventional spray drying operations as well as simple mixing.

Detergent formulations utilizing the compounds prepared by this invention will contain from 1 to 75% by weight preferably from 5 to 50% by weight of such compounds. Such compounds can be utilized as the sole detergency builder in the compositions or in combination with other known detergency builders such as water-soluble inorganic builder salts, for example, alkali metal carbonates, borates, phosphates, polyphosphates, bicarbonates and silicates or organic builders such as salts of nitrilotriacetic acid, phytic acid, sodium citrate, water-soluble polymeric polycarboxylates as described in U.S. Pat. No. 3,308,067 and the like.

The detergent formulations will additionally contain at least 8% by weight of a surfactant. Any of the numerous well known anionic, nonionic, zwitterionic or ampholytic surfactants can be employed.

Examples of suitable anionic surfactants include alkyl ether sulfonates, alkyl sulfates, acyl sarcosinates; acyl esters of isocyanates, acyl N-methyl taurides, and alkyl aryl sulfonates. The foregoing materials are used in the form of their water-soluble sodium, potassium, ammonium and alkyl ammonium salts. Specific examples include sodium lauryl sulfate; sodium N-methyl lauryl tauride; sodium dodecyl benzene sulfonate; and triethanol amine undecanol benzene sulfonate.

Examples of suitable nonionic detergents include alkyl phenol and alcohol alkoxylates including condensates of 1-decanol or 1-undecanol with from 3 to 5 molecular proportions of ethylene oxide; condensates of monohydroxy or polyhydroxy alcohols such as oleyl alcohol or 1-tridecanol with from 9 to 15 molecular proportions of ethylene oxides; alkyl internal vicinal dialkoxy or hydroxy alkoxy compounds as described in U.S. patent application Ser. No. 197,504 filed Nov. 10, 1971 and copending herewith; and condensates of alkylene oxides with organo amines, for example, ethylene diamine and amides such as N-octadecyl diethanol amide.

Suitable ampholytic surfactants include the amino alkene sulfonates such as sodium C-pentadecyl, N-methyl amido ethyl sulfonate potassium C-octyl N-naphthalene amino propyl sulfonate; ammonium C-decyl, N-cyclo propyl amido butyl sulfonate, and aliphatic amine derivatives in which the aliphatic substituent contains an anionic water-solubilizing substituent such as a carboxy, sulfo, phosphato, or phosphino group, for example, sodium-3-dodecyl amino propionate and sodium-3-dodecyl amino propane sulfonate.

Examples of zwitterionic surfactants include derivatives of quaternary ammonium phosphonium and sulfonium compounds such as 3-(N,N-dimethyl-N-hexadecyl ammonio) propane-1-sulfonate and 3-(N,N-dimethyl-N-hexadecyl ammonio-2-hydroxy propane-1-sulfonate).

It will be understood that the above examples of supplementary surfactants are by no means comprehensive. Numerous other surfactants are known to those skilled in the art and are set forth in such familiar references as *Surface Active Agents* by A. M. Schwartz and James W. Perry. It will be further understood that the use of such surfactants will be in accordance with conventional, well-understood practices of detergent formulation. For example, cationic and anionic detergents will not normally be employed in combination due to recognized problems of precipitation of insoluble products.

In accordance with general practice, the ratio of the detergency building components to the surfactant components will be in the range of from 1:2 to about 12:1 by weight.

In addition to surfactant and builder components, the detergent formulations may contain fillers such as sodium sulfate and minor amounts of bleaches, dyes, optical brighteners, soil anti-redeposition agents, perfumes, and similar conventional detergent formulation additives.

The invention is further illustrated by the following Examples wherein all parts and percentages are by weight unless otherwise indicated.

EXAMPLE I

About 172 grams of 2,2,5,5-tetracyanotetrahydrofuran is added to 1000 grams of a stirred 27% by weight aqueous sodium hydroxide solution maintained at 75°C and the reaction medium is maintained at such temperature until evolution of $NH_3$ ceases. Crystalline product is separated from resulting slurry by filtration.

The product after drying at 60°C is analyzed as being tetrasodium-2,2,5,5-tetrahydrofuran tetracarboxylate containing 1.5 moles to 2 moles water of hydration. Drying the product for about 4 hours at 200°C yields anhydrous tetrasodium-2,2,5,5-tetrahydrofuran tetracarboxylate.

EXAMPLE II

The procedure described in Example I above is repeated with the exception that potassium hydroxide is substituted for sodium hydroxide. The corresponding tetrapotassium salt products are obtained, the crystalline hydrate is separated by evaporation of water.

EXAMPLE III

The products produced according to Examples I and II are tested for sequestration characteristics and are found to effectively sequester $Ca^{++}$ ions.

EXAMPLE IV

Detergent formulations containing 12% linear alkylbenzene sulfonate having an average alkyl chain length of about 12 carbon atoms; from 5 to 75% of the product produced by the procedures of Examples I and II; 12% sodium silicate having an $SiO_2$ to $Na_2O$ ratio of about 2.4; and a quantity of sodium sulfate sufficient to equal 100% are found, in laundry operations, to clean soiled samples of cotton and polyester/cotton broadcloth substantially better than otherwise identical formulations containing no builder. These tests demonstrate the compounds to be effective detergency builder materials.

What is claimed is:

1. A process for preparing compounds represented by the formula

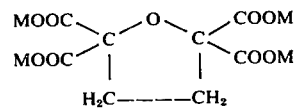

wherein M is selected from the group consisting of sodium and potassium, said process comprising adding 2,2,5,5-tetracyanotetrahydrofuran to an aqueous solution of sodium hydroxide or potassium hydroxide maintained during the addition at a concentration such that the sodium hydroxide or potassium hydroxide is present in an amount in excess of that stoichiometrically required to hydrolyze the 2,2,5,5-tetracyanotetrahydrofuran in the reaction medium and hydrolyzing the 2,2,5,5-tetracyanotetrahydrofuran.

2. The process of claim 1 further comprising crystallizing hydrates of said compounds from the solution.

3. The process of claim 2 wherein M is sodium and the hydrolysis is conducted in excess sodium hydroxide.

4. The process of claim 2 wherein said hydrates are crystallized by providing from 10 to 30% by weight sodium hydroxide in said solution in addition to the sodium hydroxide required for hydrolysis of the 2,2,5,5-tetracyanotetrahydrofuran.

5. The process of claim 2 further comprising heating the hydrates to liberate water of hydration.

* * * * *